(12) United States Patent
Wang et al.

(10) Patent No.: US 11,743,760 B2
(45) Date of Patent: *Aug. 29, 2023

(54) METHOD AND DEVICE IN A RADIO NETWORK

(71) Applicant: Telefonaktiebolaget LM Ericsson (publ), Stockholm (SE)

(72) Inventors: Min Wang, Luleå (SE); Jan Christoffersson, Luleå (SE); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,450

(22) Filed: Mar. 17, 2021

(65) Prior Publication Data
US 2021/0204166 A1 Jul. 1, 2021

Related U.S. Application Data (63) Continuation of application No. 16/500,461, filed as application No. PCT/EP2018/061630 on May 4, 2018, now Pat. No. 10,986,531.

(30) Foreign Application Priority Data

May 5, 2017 (WO) ................ PCT/CN2017/083334

(51) Int. Cl.
*H04W 28/02* (2009.01)
*H04W 72/1268* (2023.01)
(Continued)

(52) U.S. Cl.
CPC ... *H04W 28/0278* (2013.01); *H04W 72/1268* (2013.01); *H04W 72/21* (2023.01);
(Continued)

(58) Field of Classification Search
CPC ......... H04W 28/0278; H04W 72/1242; H04W 72/1268; H04W 72/1284; H04W 72/14;
(Continued)

(56) References Cited

U.S. PATENT DOCUMENTS 7,869,461 B2 1/2011 Lohr et al.
8,750,389 B2 6/2014 Legrand
(Continued)

FOREIGN PATENT DOCUMENTS

CN 101568186 A 10/2009
CN 102356659 A 2/2012
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.2.1, Mar. 1, 2017, pp. 1-106, 3GPP.
(Continued)

*Primary Examiner* — Thai Nguyen
(74) *Attorney, Agent, or Firm* — Coats & Bennett, PLLC (57) ABSTRACT

The invention refers to a method for a communication device in a radio network, which comprises a step of performing a first transmitting, in a first time slot of a first duration, comprising transmitting a Buffer Status Report, BSR, for a plurality of logical channels, and a step of performing a second transmitting, in a second time slot of a second duration, comprising transmitting a Scheduling Request, SR, for at least a first part of the plurality of logical channels; the invention further refers to corresponding communication devices, to a computer-readable storage, to a computer program and to a carrier.

25 Claims, 7 Drawing Sheets

(51) Int. Cl.
*H04W 72/21* (2023.01)
*H04W 72/23* (2023.01)
*H04W 72/566* (2023.01)
*H04W 72/0446* (2023.01)

(52) U.S. Cl.
CPC ......... *H04W 72/23* (2023.01); *H04W 72/569* (2023.01); *H04W 72/0446* (2013.01)

(58) Field of Classification Search
CPC ......... H04W 72/0446; H04W 28/0284; H04W 88/02
See application file for complete search history.

(56) References Cited

U.S. PATENT DOCUMENTS

| | | | |
|---|---|---|---|
| 8,804,630 | B2 | 8/2014 | Ito et al. |
| 9,402,193 | B2 | 7/2016 | Sampath et al. |
| 9,479,957 | B2 | 10/2016 | Lee et al. |
| 2012/0039263 | A1* | 2/2012 | Moberg ............ H04W 72/1284 370/329 |
| 2012/0069805 | A1 | 3/2012 | Feuersanger et al. |
| 2015/0098441 | A1 | 4/2015 | Peng |
| 2015/0305061 | A1* | 10/2015 | Feuersaenger .... H04W 28/0278 370/329 |
| 2016/0242193 | A1 | 8/2016 | Hong et al. |
| 2016/0374050 | A1 | 12/2016 | Prasad et al. |
| 2017/0013610 | A1 | 1/2017 | Lee et al. |
| 2017/0055294 | A1* | 2/2017 | Lee ................... H04W 72/1284 |

FOREIGN PATENT DOCUMENTS

| | | | | |
|---|---|---|---|---|
| CN | 103079263 | A | | 5/2013 |
| CN | 103609188 | A | | 2/2014 |
| CN | 105580419 | A | | 5/2016 |
| CN | 106454687 | A | | 2/2017 |
| CO | 6331398 | A2 | | 10/2011 |
| EP | 1463217 | A1 | | 9/2004 |
| EP | 2675081 | A1 | * | 12/2013 ........ H04W 72/1278 |
| EP | 2675081 | A1 | | 12/2013 |
| RU | 2504126 | C1 | | 1/2009 |
| RU | 2518088 | C2 | | 6/2014 |
| WO | 2009026739 | A1 | | 3/2009 |
| WO | 2010112236 | A1 | | 10/2010 |
| WO | 2011038768 | A1 | | 4/2011 |
| WO | 2013164105 | A1 | | 11/2013 |
| WO | 20130191353 | A1 | | 12/2013 |
| WO | 2015046780 | A1 | | 4/2015 |
| WO | 2016057298 | A1 | | 4/2015 |
| WO | 2016171767 | A1 | | 10/2016 |
| WO | 2017127126 | A1 | | 7/2017 |
| WO | WO-2017127126 | A1 | * | 7/2017 ........ H04W 72/1278 |

OTHER PUBLICATIONS

Huawei et al., "SR and BSR Procedure in Short TTI", 3GPP TSG-RAN WG2 Meeting #97, Athens, Greece, Feb. 13, 2017, pp. 1-3, R2-1701887, 3GPP.

Ericsson, "Logical Channel Prioritization with Short TTI", 3GPP TSG-RAN WG2 #97bis, Spokane, USA, Apr. 3, 2017, pp. 1-3, R2-1703210, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 15)", Technical Specification, 3GPP TS 36.321 V15.1.0, Mar. 1, 2018, pp. 1-109, 3GPP.

Qualcomm Incorporated, Enhanced SR and BSR, 3GPP TSG-RAN WG2 Meeting #97bis, Spoken, USA, Apr. 3-7, 2017, R2-170xxxx.

CATT, SR and BSR for sTTI, 3GPP TSG-RAN WG2 Meeting #97bis, Spokane, USA, Apr. 3-7, 2017, R2-1703132.

Qualcomm Incorporated, Logical channel prioritization in NR with multiple numerologies/TTIs, 3GPP TSG-RAN WG2 Meeting #97bis, Spokane, USA, Apr. 3-7, 2017, R2-17xxxx.

Qualcomm Incorporated, SR and BSR for short TTI, 3GPP TSG-RAN2 Meeting #97bis, Spokane, USA, Apr. 3-7, 2017, R2-1703693.

Huawei et al., "SR and BSR Procedure in Short TTI", 3GPP TSG-RAN WG2 Meeting #97bis, Spokane, USA, Apr. 3, 2017, pp. 1-3, R2-1703643, 3GPP.

Ericsson, "Logical Channel Prioritization with short TTI", 3GPP TSG-RAN WG2 #97, Athens, Greece, Feb. 13, 2017, pp. 1-3, R2-1701609, 3GPP.

3rd Generation Partnership; Technical Specification Group GSM/EDGE Radio Access Network; Cellular System Support for Ultra Low Complexity and Low Throughput Internet of Things; (Release 13); 3GPP TR 45.820 V2.0.0 (Aug. 2015).

Intel Corporation, "Scheduling request design for NR", TSG RAN WG1 Meeting #88bis, Spokane, USA, Apr. 3-7, 2017, pp. 1-5, R1-1704760, 3GPP.

Huawei et al., "BSR enhancements with multiple numerologies", TSG-RAN WG2 #98, Hangzhou, China, May 15-19, 2017, pp. 1-4, R2-1705626, 3GPP.

Huawei et al., "SR and BSR Procedure in Short TTI", TSG-RAN WG2 Meeting #97bis, Spokane, USA, Apr. 3-7, 2017, pp. 1-4, R2-1703643, 3GPP.

ETRI, "Details of BSR formats", TSG-RAN WG2 Meeting #99bis, Prague, Czech Republic, Oct. 9-13, 2017, pp. 1-3, R2-1711119, 3GPP.

Ericsson, "Logical Channel Prioritization with short TTI", TSG-RAN WG2 #97, Athens, Greece, Feb. 13-17, 2017, pp. 1-5, R2-1701609, 3GPP.

Nokia et al., "Remaining details on PRACH formats", TSG-RAN WG1#92, Greece, Athens, Feb. 26-Mar. 2, 2018, pp. 1-20, R1-1802021, 3GPP.

* cited by examiner

METHOD AND DEVICE IN A RADIO NETWORK

The present application is a continuation of U.S. patent application Ser. No. 16/500,461, which was filed Oct. 3, 2019, which is a national stage application of PCT/EP/2018/061630, which was filed May 4, 2018, and claims priority of PCT/CN2017/083334, which was filed May 5, 2017, the disclosures of each of which are incorporated herein by reference in their entirety.

RELATED APPLICATIONS

This application is a continuation of U.S. patent application Ser. No. 16/500,461, filed on Oct. 3, 2019, which is a national stage application of PCT/EP2018/061630, filed on May 4, 2018.

TECHNICAL FIELD

The present disclosure relates to communication network, particularly to a method for transmitting buffer status reports and scheduling requests in a radio network.

BACKGROUND

3rd Generation Partnership Project (3GPP) TS 36.321 specifies a framework for buffer status reporting. Buffer status reporting is used by a user equipment (UE) to report to an eNB amount of data stored in its buffers for transmission. The eNB uses these reports to allocate resources to UEs, and to prioritize resource allocation between different UEs.

The UE triggers a Regular BSR when uplink (UL) data becomes available for transmission and the data belongs to a Logical Channel Group (LCG) (or radio bearer group) with higher priority than those for data already existed in the buffer or if the UE buffers were empty just before this new data became available for transmission. If no UL grant is available, an SR transmission will be triggered.

An SR is either sent on a Random Access Channel (RACH), i.e., a Random Access Scheduling Request (RA-SR), or on a dedicated resource on Physical Uplink Control Channel (PUCCH), i.e., a Dedicated Scheduling Request (D-SR). A D-SR is typically used when the UE uplink is time synchronized. The purpose is to enable a UE to rapidly request resources for uplink data transmission. In 3GPP, a dedicated solution for the scheduling request has been agreed. For the dedicated approach, each active user is assigned a dedicated channel for performing the scheduling request. The benefit with this method is that no UE ID has to be transmitted explicitly, since the UE is identified by the channel used. Furthermore, no intra-cell collisions will occur in contrast to the contention based approach.

The D-SR is repeatedly transmitted on consecutive SR opportunities on PUCCH until the UE receives an UL grant on Physical Downlink Control Channel (PDCCH). The transmission is stopped at least when PUCCH resources are released and/or UL synch is lost even if the UE has not received any UL grant on PDCCH. After stopping transmission of the D-SR, the UE transmits the RA-SR (i.e., accesses the system via RACH).

The RA-SR is used when the UE has lost UL synchronization or if it has no D-SR resources.

For Buffer Status Report (BSR), there are short BSR reports and long BSR reports. For a long BSR report, the buffer status of 4 logical channel groups (LCG) can be integrated into one medium access control (MAC) control element (CE). For a short BSR, it is used when the selected physical channel cannot provide enough capacity for a long BSR or a short BSR is enough (e.g., only one LCG has data for transmission). There are various conditions to trigger BSR reports to eNB. In one example, a BSR report can be triggered when data becomes available for a new logical channel. In another example, it can be triggered periodically at expiring of a preconfigured timer. Furthermore, a BSR can be also reported when there is still enough capacity available in a MAC PDU, in which case it is referred to as a padding BSR. If a BSR is triggered due to data becoming available for transmission for a logical channel for which logicalChannelSR-ProhibitTimer is configured by upper layers: start or restart the logicalChannelSR-ProhibitTimer, which prohibits the SR transmission before the timer expires. As the logicalChannelSR-ProhibitTimer is running, the UE is prohibited from transmitting SRs, which means that a BSR for this logical channel is prohibited from further transmitting.

In 3GPP discussions, PDU sessions are established between UEs and the core network. A UE may have multiple PDU sessions for which a user plane tunnel is established between the core network and the radio network. Each PDU session may include a number of PDU flows. Packets are grouped into "flows" according to filters, e.g., TFTs (5 tuple). Each flow is associated with a "Flow ID". This "Flow ID" is expected to be included in a packet header, received in the user plane tunnel per PDU session from the core network to the radio access network, which can be called as a new radio, NR.

The flows are then mapped to data radio bearers in the radio access network. The radio access network is responsible for decisions of mapping flows to data radio bearers. Multiple flows may be mapped to the same data radio bearer. Also, flows from different PDU sessions may be mapped to the same data radio bearer.

Which flow belongs to which data radio bearer needs to be indicated to UEs. This indication may be done using control signaling to the UEs, and by marking each user data packet with a flow ID and possibly a PDU session id (or user data tunnel ID) by the radio access network in the downlink transmission. In the same way the UEs need to mark the user data packets in the uplink transmissions such that the radio access network may map the packets to the correct flows and PDU sessions towards the core network. Depending on the uniqueness of the PDU session IDs and the flow IDs, the value range of the identities varies.

Multiple service support:

The flows of a UE are mapped to logical channels in Layer 2 and each logical channel has been assigned a priority (i.e., logical channel priority, LCP). The MAC scheduler then schedules the transmissions for the logical channels according to the descending order of LCPs for the logical channels. To optimize the user experience, was agreed that a logical channel can be further configured with preferred numerology/slot duration to fulfil differentiated delay requirements.

SUMMARY

When a UE has multiple logical channels of different priorities, only the logical channel priority is considered in BSR report construction: i.e., the buffer status of the logical channel group with the highest priority has higher priority to be included in the BSR report. It does not consider the difference on the required slot duration/numerology of different logical channels. For instance, prohibiting of SR/BSR transmission using short slot for a logical channel due to previous SR/BSR transmission for the logical channel using long slot can result in delay increase (or packet discarding due to exceeding delay budget) of the logical channel.

It is an object of the present disclosure to resolve or alleviate at least one of the problems mentioned above.

According to one embodiment of the invention, there is provided a method for a communication device in a radio network, the method comprises a step of performing a first transmitting, in a first time slot of a first duration, comprising transmitting a first Buffer Status Report, BSR, or a first Scheduling Request, SR, for one or more logical channels; and a step of performing a second transmitting, in a second time slot of a second duration, comprising transmitting a second BSR or a second SR, for at least a first part of the one or more logical channels.

According to another embodiment of the invention, there is provided a communication device in a radio network, comprising: a first component for performing a first transmitting, in a first time slot of a first duration, comprising transmitting a first Buffer Status Report, BSR, or a first Scheduling Request, SR, for one or more logical channels; and a second component for performing a second transmitting, in a second time slot of a second duration, comprising transmitting a second BSR or a second SR, for at least a first part of the one or more logical channels.

According to another embodiment of the invention, there is provided a communication device in a radio network, comprising: a storage, adapted to store data and instructions therein; a processing system, adapted to perform the method of the embodiments; a network interface, adapted to communicate data with other entities in the radio network; and a communication medium, adapted to facilitate communication among at least the storage, the processing system, and the network interface.

According to another embodiment of the invention, there is provided one or more computer-readable storage storing computer-executable instructions thereon, that when executed by a computing device, cause the computing device to implement the method of the embodiments.

According to another embodiment of the invention, there is provided a device adapted to perform the method of the embodiments.

According to another embodiment of the invention, there is provided a computer program, comprising instructions which, when executed on at least one processor, cause the at least one processor to carry out the method according to the embodiments.

In this way, as a whole, the embodiments of the disclosure suggest to not prohibit the BSR/SR transmission for some high priority and delay sensitive logical channels due to the previous BSR/SR transmission when a preconfigured condition is fulfilled. In other words, the condition for starting/restarting a timer such as logicalChannelSR-ProhibitTimer, that prohibits the BSR/SR transmission during the timer running, is changed, so that the communication device, such as the UE is allowed to transmit BSR/SR for more than 1 times for the same or subset of logical channels, before a prohibit timer is launched. By scenarios, the SR/BSR transmission diversity gain for URLLC is enhanced, and the coverage of BSR/BSR transmission for URLLC is enhanced.

BRIEF DESCRIPTION OF THE DRAWINGS

Exemplary features of the present invention are set forth in the appended claims. However, the present invention, its implementation mode, other objectives, features and advantages will be better understood through reading the following detailed description on the exemplary embodiments with reference to the accompanying drawings, wherein the drawings:

DETAILED DESCRIPTION

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present disclosure is described below with reference to block diagrams and/or flowchart illustrations of methods, nodes, devices and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Figure 1:
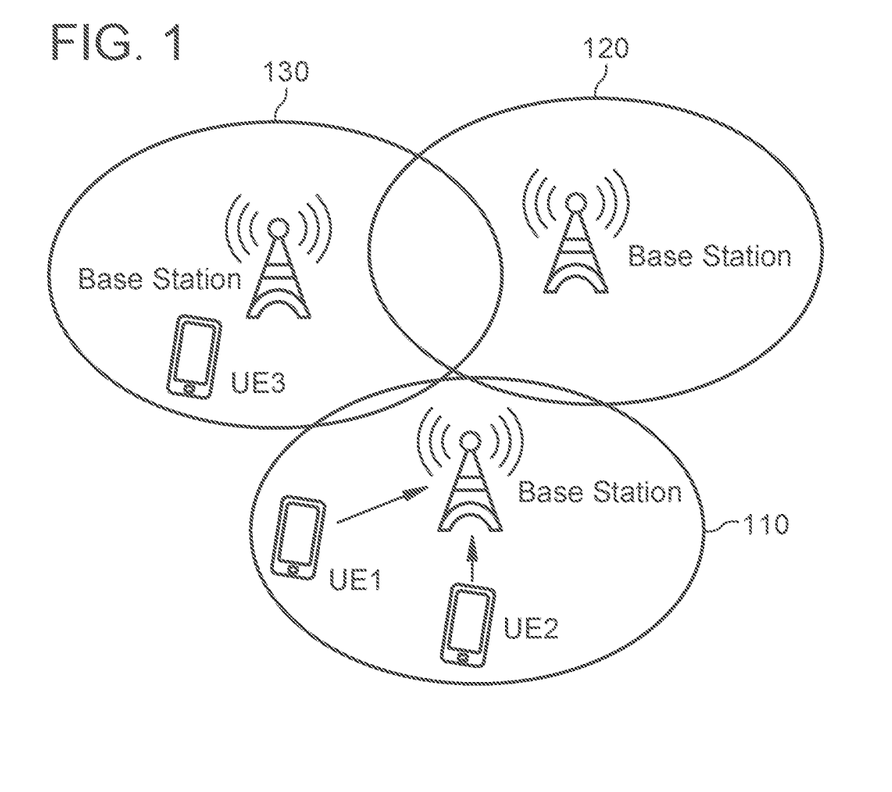
FIG. 1 schematically shows a networking environment in a radio network.

FIG. 1 schematically shows a networking environment in a radio network. Without any loss of any generality, it is assumed that there are three Base Stations (BSs) in FIG. 1, i.e., base station 110, 120, and 130. Each base station may serve or cover one or several cells of a radio communication system. That is, the base station provides radio coverage in the cell(s) and communicates over an air interface with user equipments, UEs operating on radio frequency band within its range. As shown in FIG. 1, Base Station 110 for example is serving two UEs, i.e., UE 1 and UE 2 in its cell.

The BS in some radio communication systems may be also referred to as "eNB", "eNodeB", "NodeB", "B node" or "gNB" for example in cellular communication systems, depending on the technology and terminology used. In the present disclosure, the transmitter may also be referred to as a Base Station (BS). The transmitter may be of different classes such as e.g. macro eNodeB, home eNodeB or pico base station, or relay node in heterogeneous or homogeneous radio networks, based on transmission power and thereby also cell size.

In the present disclosure, the UE may be a communication device also known as mobile terminal, and/or radio terminal, which is enabled to communicate wirelessly with a transmitter in a radio communication network, sometimes also referred to as a cellular radio system. For instance, a communication device may be, but is not limited to, mobile phone, smart phone, sensor device, meter, vehicle, household appliance, medical appliance, media player, camera, or any type of consumer electronic, for instance, but not limited to, television, radio, lighting arrangement, tablet computer, laptop, or Personal Computer (PC). The communication device may be a portable, pocket-storable, hand-held, computer-comprised, or vehicle-mounted mobile device, enabled to communicate voice and/or data, via a radio connection.

Figure 2:
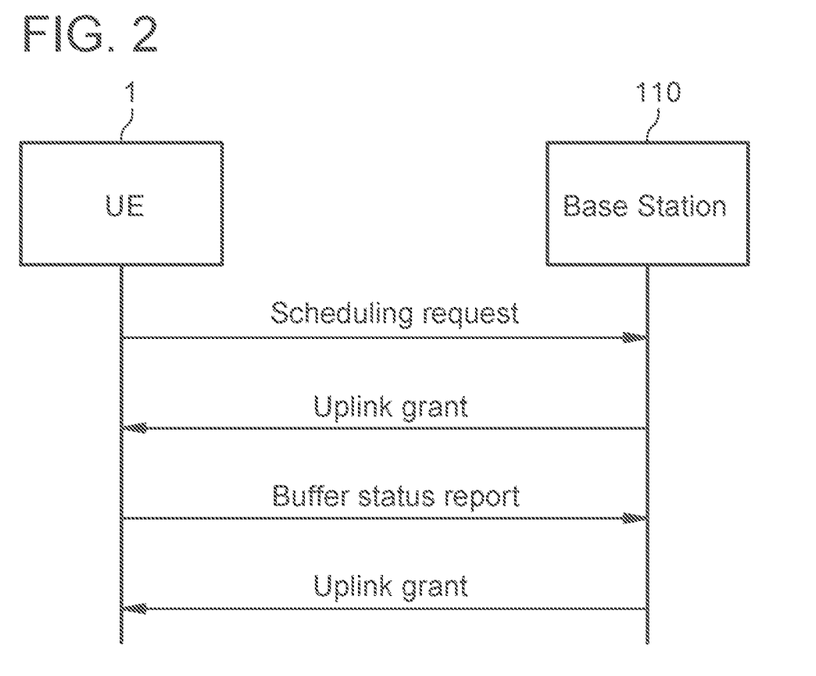
FIG. 2 schematically shows an uplink transmission procedure for a communication device in a radio network.

FIG. 2 schematically shows an uplink transmission procedure with respect to a communication device in a radio network. By way of example, the uplink transmission procedure is shown for UE1 and base station, BS 110 of FIG. 1. It is assumed that UE1 is performing an uplink transmission to the BS 110 in a certain frequency band. If there is some uplink data to be transmitted, the UE 1 will initiate a scheduling request (SR), which is either transmitted on the Random Access Channel (RACH) or on a dedicated resource on the Physical Uplink Control Channel. As an example, the SR may be only of one bit length, which indicates whether there is uplink data to be transmitted from the UE 1 to the BS 110 or not. For another example, the SR may indicate whether there is uplink data for a specific logical channel to be transmitted in the buffer or not. For instance, in certain application scenarios, the specific logical channels could be logical channels with high priority, such as used for emergency calls for example.

Upon receiving the SR, the BS 110 will determine whether to send an uplink grant signaling allocating the uplink transmission resource for the communication device based on a specific scheduling and resource allocation mechanisms employed in the BS 110. Then, the UE 1 may transmit a buffer status report (BSR) to the BS 110 to report the one or more payload sizes for one or more logical channels to be uplink-transmitted. This BSR reporting mechanism can be implemented in various ways. For example, the BSR may be a short BSR, which only contains one logical channel group (LCG) comprising one or more logical channels therein. For another example, the BSS may be a long BSR, which contains more than one LCG. There is also a buffer size field related to each LCG of the more than one LCG in the BSR, which indicates a size of the payload for each LCG in the buffer of the UE 1. For still another example, the BSR may indicate the buffer size of the payload for a specific logical channel, which may be directed to some high priority services. It should be noted that different BSR transmission mechanisms or algorithms may be implemented, depending on the application scenario and specific system design requirement.

Upon receiving the BSR, the BS 110 will determine whether to send an uplink grant signaling allocating the uplink transmission resource. The UE 1 will perform an uplink transmission for one or more logical channels according to the priority of the services or traffic flows related to the logical channels. This may be referred to as an uplink scheduling.

In the present disclosure, the wireless radio network may be a new radio network, in which there may be different time slot configurations for the uplink transmission, and for example one time slot configuration is related to a first time slot of a first duration and the other slot configuration is related to a second time slot of a second duration. For example, the configuration of the first time slot of a first duration is applicable for a first portion of the band, and the configuration of the second time slot of a second duration is applicable for a second portion of the band.

In an embodiment, the wireless radio network may be a Long Term Evolution (LTE) network in 3GPP with different/variable transmission time interval (TTI) configurations. It should be noted that the two portions of band may be located in two separate carriers respectively; the methods described in the present disclosure are still applicable for such scenarios. Preferably, the second time slot of a second duration may be shorter than the first time slot of a first duration, as short time slots are desirable for delay sensitive traffic flows or services.

In one or more embodiments of the inventions, the SR and/or BSR transmission of one or more logical channels may take both the time slot configuration in the physical layer (PHY) and the priority of the different logical channel into consideration to implement a more efficient and reliable uplink transmission strategy. For example, when the UE receives an uplink grant carrying a time slot configuration (for example, a first time slot of a first duration or a second time slot of a second duration), the BSR related to the logical channel will not be transmitted in the uplink transmission resource indicated by the uplink grant if the time slot configuration of the logical channels does not match the one indicated or carried in the uplink grant.

For another example, a delay sensitive service related to a logical channel may require a second time slot configuration, while the current uplink transmission resource requires a first time slot transmission. In such cases, although the priority of the delay sensitive service may be higher than other logical channels, it still will not be transmitted due to the unmatching of the time slot configurations.

Figure 3:
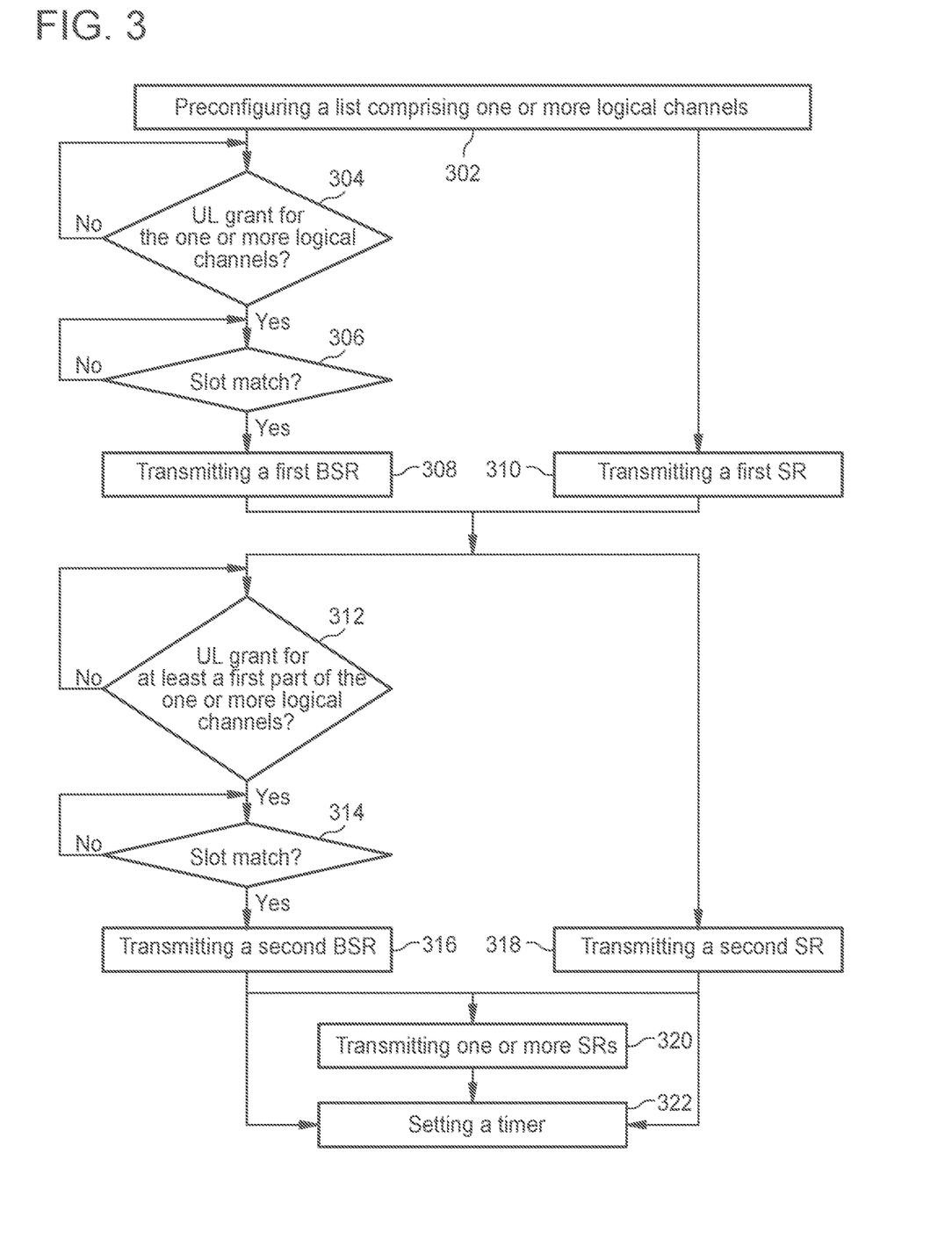
FIG. 3 schematically shows a flowchart of a method for a communication device according to one or more embodiments of the invention.

FIG. 3 schematically shows a flowchart of a method for a communication device according to one or more embodiments of the invention. The following description may also be made with reference to FIG. 1. Starting at step 302, one or more target logical channels are preconfigured in the communication device, for example, the UE (e.g., UE1), such as by way of radio resource control (RRC) signaling.

Then the flowchart forks. In one fork, at step 304, the communication device determines whether a UL grant message for the one or more logical channels is detected. In case that a UL grant message for the one or more logical channels is detected (the "Yes" branch), the communication device determines at block 306 whether the slot duration indicated in the UL grant message matches the one required by a first BSR. If "Yes", the communication device at block 308 transmits the first BSR in a first time slot of a first duration, for example a time slot with a duration of 1 millisecond (ms). In one non-limiting example, the first BSR is a long BSR multiplexing respective BSRs of 4 logical channels. In another non-limiting example, the BSR is a short BSR for only just one logical channel. Generally, transmitting BSRs are based on their respective priorities.

In another fork coming out from block 302, as an SR is about to be transmitted, generally no UL grant message is required, and generally no slot match should be determined. At block 310, the communication device directly transmits a first SR in the first time slot of the first duration. Up till now, the first transmitting stage is done.

Then the fork confluents to a next stage, while the flowchart of the next stage still forks. In one fork, at step 312, the communication device determines whether a UL grant message for at least part of the one or more logical channels is detected. Said at least part of the one or more logical channels could be all of the one or more logical channels, or could be a subset (a part) of the one or more logical channels, e.g., selected one or more logical channels with higher priorities. In case that a UL grant message for at the one or more logical channels with higher priorities is detected (the "Yes" branch), the communication device determines at block 314 whether the slot duration indicated in the UL grant message matches the one required by a second BSR. If "Yes", the communication device at block 316 transmits the second BSR in a second time slot of a second duration, for example in a time slot of a duration of 0.25 ms. In one non-limiting example, the second BSR is also a long BSR multiplexing all of respective BSRs of 4 logical channels that transmitted in block 308. In another non-limiting example, the second BSR is a short BSR for only just one logical channel. Again, transmitting BSRs are based on their respective priorities.

In another fork, again, as an SR is about to be transmitted, generally no UL grant message is required, and generally no slot match should be determined. At block 318, the communication device directly transmits a second SR in a second time slot of the second duration (e.g., 0.25 ms). Up till now, the second transmitting stage is done.

In an embodiment, the durations may be different from above examples: By way of example, the first time slot may have a duration of 0.25 ms and the second time slot may have a duration of 1 ms.

It is also to be noted that the SRs could simply be of a single bit, but can indicate related one or more logical channels by its transmitting resources. Alternatively, the SRs may comprise multiple bits, and can indicate for itself related one or more logical channels. It is yet also noted that the second BSR could comprise the whole first BSR or a subset of the first BSR, or vice versa, and similarities applies to the SRs.

Furthermore, the second SR can be repeatedly transmitted, for example, periodically, for example, if no uplink grant is received. Alternatively, one or more SRs for another part of the one or more logical channels may be needed to be transmitted after the second transmitting. This is done at block 320, and still in a time slot of the second duration.

It is to be noted that the time slots of the first duration and the time slots of the second duration are transmitted on different bands, as described with reference to FIG. 1 and/or 2. The communication device operates in a radio network, such as a new radio network or an Long Evolution (LTE) Network, in which the communication device operates in time slots of the first duration in a first portion of a band and also operates in time slots of the second duration in a second portion of the band, wherein the first portion and the second portion are different.

It is to be noted that the UL grant messages for the first BSR and the second BSR may be received at the same time or at different times, for example sequential.

After the second transmitting or after block 320, a timer such as logicalChannelSR-ProhibitTimer, that prohibits the BSR/SR transmission during the timer running, is set.

As a whole, the method as discussed above provides four possibilities: firstly, transmitting a BSR, secondly transmitting an SR, or firstly transmitting an SR, secondly transmitting a BSR, or firstly transmitting a BSR, secondly transmitting a BSR, or firstly transmitting an SR, secondly transmitting an SR.

As describe above, a prohibition to perform a further BSR/SR transmission due to a previous BSR/SR transmission may be released for a subset of high priority (and delay sensitive) logical channels, when a preconfigured condition is fulfilled. In other words, the condition for starting/restarting a timer such as logicalChannelSR-ProhibitTimer, that prohibits the BSR/SR transmission during the timer running, is changed for the subset of logical channels in view of current 3GPP standards, so that the communication device, such as the UE is allowed to transmit BSR/SR for more than 1 times for the subset of logical channels, before starting the prohibit timer. By such scenarios, the diversity gain of the SR/BSR transmission as well as the coverage of BSR/BSR transmission may be is enhanced.

Figure 4:
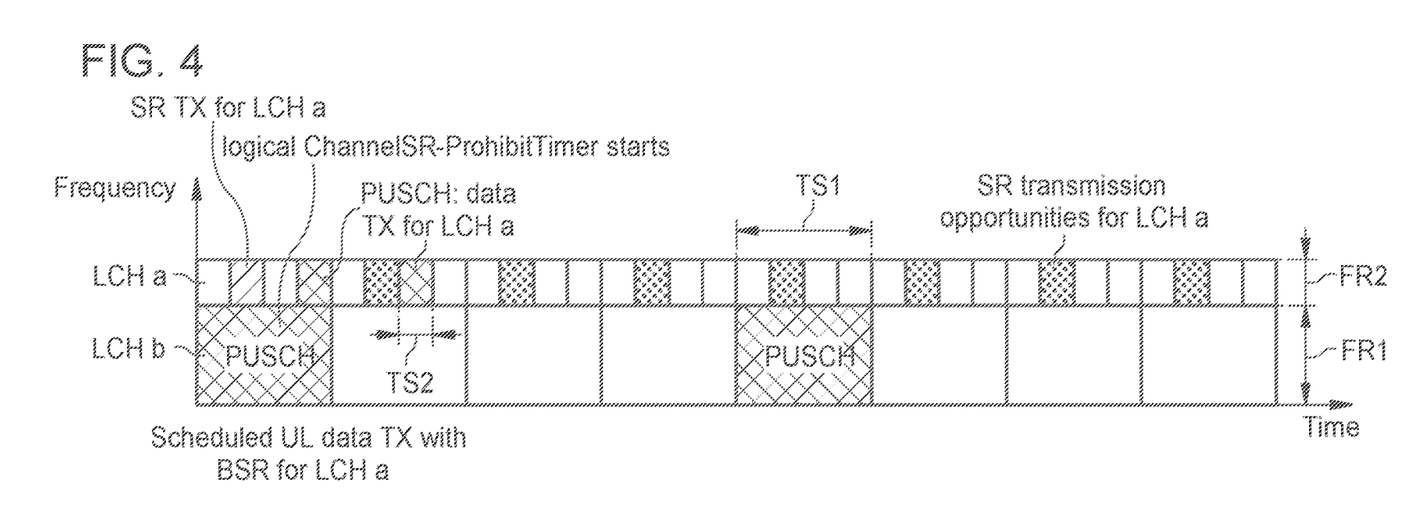
FIG. 4 schematically shows an exemplary time and frequency arrangement for a multiple BSR/SR transmission according to one or more embodiments of the invention.

FIG. 4 is an exemplary time and frequency arrangement for a multiple BSR/SR transmission according to one or more embodiments of the invention. As illustrated, there are two portions FR1 and FR2 of a frequency band of the communication device, that is a first portion FR1 of the band which is shown as the lower part of the frequency domain or band and a second portion FR2 of the band which is shown as the upper part in the frequency domain or band. For example, the time slots in the first portion of the band, in the following also being referred to as first time slot(s) TS1 are configured having a first duration of time, and the time slot in the second portion of the band, in the following also being referred to as second time slot(s) TS2 are configured having a second duration of time. For example, the second time slot TS2 of a second duration is shorter than the first time slot TS1 of the first duration in time domain. The first time slot TS1 may be referred to as long time slot and the second time slot TS2 may be referred to as short time slot. As discussed above, shorter second time slots TS2 of the second duration may be desirable for delay sensitive applications or service flows, such as real time traffic control or real time monitoring or surveillance application scenarios. It is advantageous for the one or more embodiments of the present invention to take the short and long time slot of different time durations for transmission and the priority of different logical channels for different services into consideration, in order to achieve a more reliable and time-efficient transmission strategy.

Referring to FIG. 4, a first logical channel LCH a and a second logical channel LCH b are depicted, wherein the first logical channel LCH a extends over the first portion or frequency range FR1 of the frequency band, and the second logical channel LCH b extends over the second portion or frequency range FR2 of the frequency band assigned to or used by the UE.

The first logical channel LCH a is assumed to be a high priority logical channel, e.g., related to an emergency application. The second logical channel LCH b may be a low priority logical channel (with a priority lower than the priority of the first logical channel LCH a).

The BSR including the buffer size of the payload for the first logical channel LCH a is transmitted together with the payload data of other logical channels, for example the second logical channel LCH b as shown in FIG. 4, in the first time slot TS1 of a first duration in the time domain and in the first portion FR1 of the band in the frequency domain.

The first time slot TS1 of a first duration may be a long transmission time slot (e.g., 1 ms). Therefore, the uplink transmission resource may be allocated late due to the long first time slot transmission. In order to reduce the transmission delay, a SR for the first logical channel LCH a may be transmitted in the shorter second time slot TS2 of a second duration (e.g., 0.25 ms) in the second portion FR2 of the band. As the transmission time interval is short for the second time slot, the first logical channel LCH a may be granted the uplink transmission resource in Physical Uplink Shared Channel (PUSCH) earlier in time, which is desirable for high priority services or delay sensitive applications of the first logical channel LCH a.

After the SR for the first logical channel LCH a is sent, in the example of FIG. 4, a timer will be started, during which any further sending of BSR and/or SR for LCH a is prohibited for a configured or set time. This timer may be realized as logicalChannelSR-ProhibitTimer, as e.g., specified in 3GPP 36321, V15.1.0. As illustrated by way of example, after the SR for LCH a is received by the network side, a PUSCH transmission resource in the second portion of the band in a first time slot of a first duration is granted for the first logical channel LCH a. Therefore, the payload of the service related to the first logical channel LCH a can be transmitted in the second portion of the band with a shorter time slot configuration, which is advantageous for the delay sensitive services. According to this example, a UE may perform:

transmitting a BSR including the buffer size of the payload for a first logical channel LCH a together with the payload data of a second logical channel LCH b in a first time slot TS 1 of a first duration in the time domain and in the first portion FR1 of the band in the frequency domain, transmitting a SR for the first logical channel LCH a in a second time slot TS 2 of a second duration in a second portion of the band, wherein the second time slot is shorter than the first time slot, and starting a timer, during which any further sending of BSR and/or SR for the first logical channel LCH a is prohibited (for a configured time).

It should be noted that although amongst a plurality of logical channels, only one logical channel with high priority is considered in FIG. 4, i.e., first logical channel LCH a, there may be more than one logical channel with high priority, thus a duplicate BSR/SR transmission in the long and in the short time slot may be performed for a plurality of logical channels. Transmitting the buffer status information for delay sensitive in both the first time slot TS1 and a second time slot TS2 results in a diversity gain for the network side to decode the buffer status information for high priority channels, e.g., first logical channel LCH a.

Figure 5:
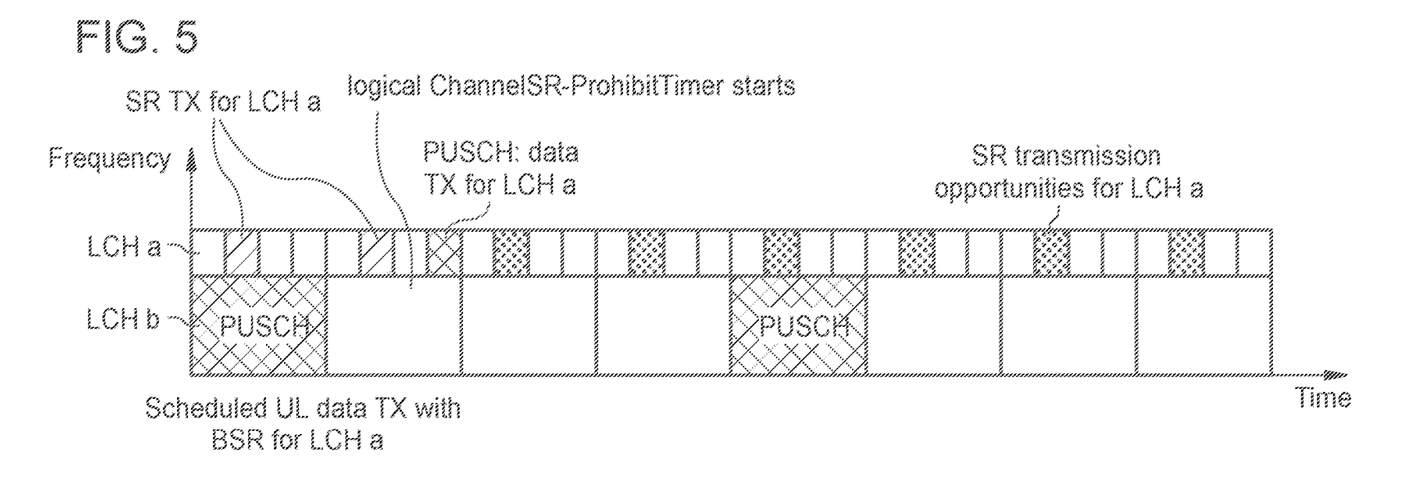
FIG. 5 schematically shows another exemplary time and frequency arrangement of a multiple BSR/SR transmission according to one or more embodiments of the invention.

FIG. 5 is another exemplary time and frequency arrangement of a multiple BSR/SR transmission according to one or more embodiments of the invention. Similarly, to FIG. 4, there are shown the two portions FR1 and FR2 of the frequency band of the communication device or UE. Further similarly, the time slots (first time slots TS1) in the first portion FR1 are configured having a longer duration of time than the time slots (second time slots TS2) in the second portion FR2. FIG. 5 further exemplarily shows the first logical channel LCH a extending over the first portion or frequency range FR1 of the frequency band, and the second logical channel LCH b extending over the second portion or frequency range FR2 of the frequency band assigned to or used by the UE.

Further similarly to FIG. 4, it is assumed that the buffer status information of the first logical channel LCH a has been transmitted in a first time slot TS 1 with the first duration, together with a payload of the traffic data in the MAC Protocol Data Unit (PDU) in the PUSCH. The difference between FIG. 5 and the previous FIG. 4 is that the SR for LCH a may be transmitted for a certain or predefined number of times (greater than 1) in additional second time slots TS2 of the second duration, if no grant is received from the network side, e.g., from a BS or an eNB or an access node. This means that the SR for the first logical channel LCH a can be transmitted in a duplicate way, which may further improve the decoding quality for the SR in the network side compared with the example given in FIG. 4. If the SR has been transmitted by the UE for the predefined number of times before an uplink grant is received, the UE starts a timer to prohibit a further transmission of the BSR/SR for the first logical channel LCH a during a certain set time related to the timer. This embodiment may be advantageous for emergency applications or highly delay sensitive applications.

According to this example, a UE may perform:

transmitting a BSR including the buffer size of the payload for a first logical channel LCH a together with the payload data of a second logical channel LCH b in a first time slot TS 1 of a first duration in the time domain and in the first portion FR1 of the band in the frequency domain, until receiving an uplink grant, repetitively transmitting a SR for the first logical channel LCH a in a second time slot TS 2 of a second duration in the second portion of the band FR2, wherein the second time slot is shorter than the first time slot, and after having transmitted the SR for a predefined number of times, starting a timer, during which any further sending of BSR and/or SR for the first logical channel LCH a is prohibited (for a configured time).

Figure 6:
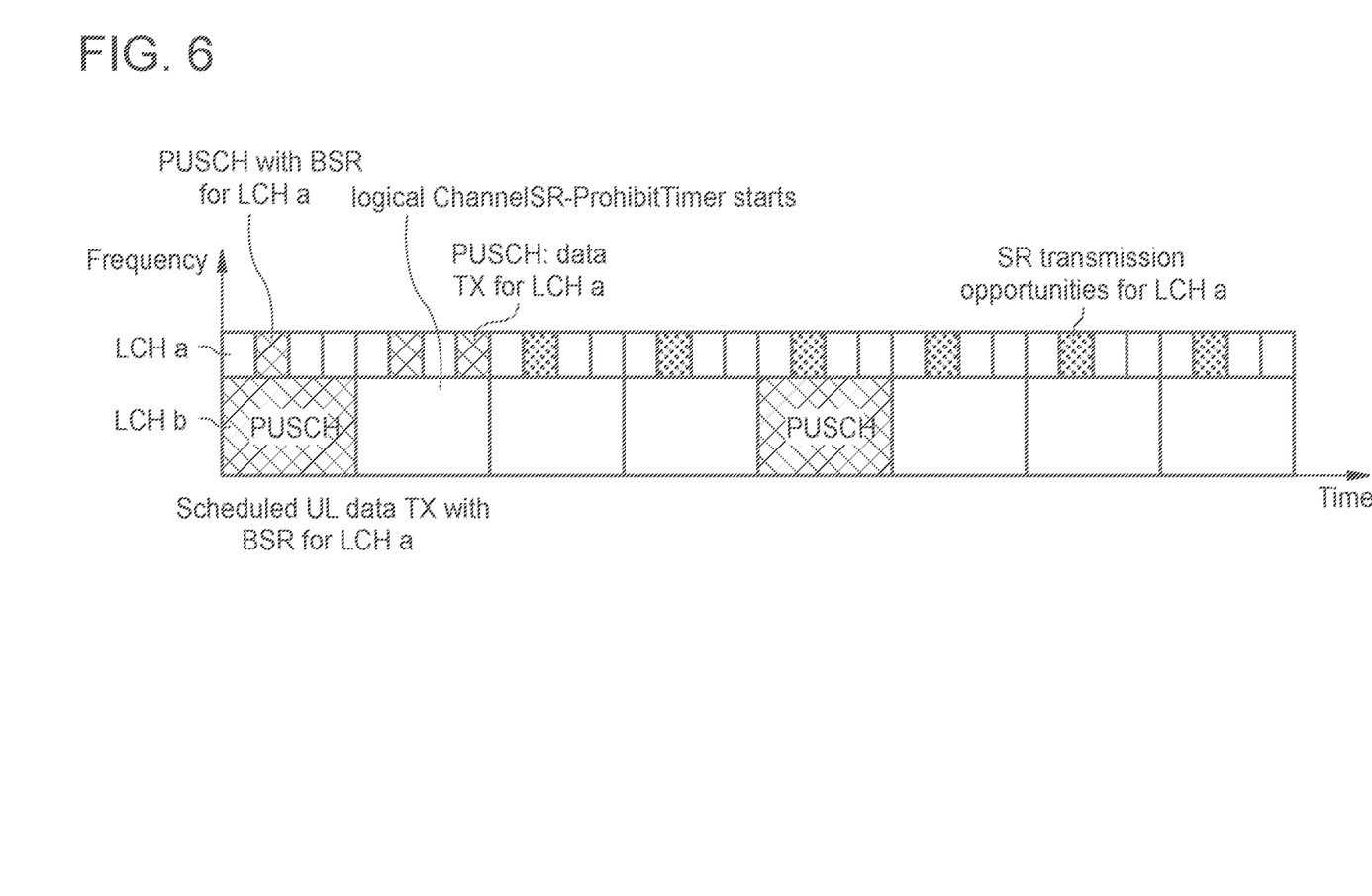
FIG. 6 schematically shows another exemplary time and frequency arrangement of a multiple BSR/SR transmission according to one or more embodiments of the invention.

FIG. 6 is another exemplary time and frequency arrangement of a multiple BSR/SR transmission according to one or more embodiments of the invention. Similarly, to FIGS. 4 and 5, there are shown the two portions FR1 and FR2 of the frequency band of the communication device or UE. Further similarly, the time slots (first time slots TS1) in the first portion FR1 are configured having a longer duration of time than the time slots (second time slots TS2) in the second portion FR2. FIG. 6 further exemplarily shows the first logical channel LCH a extending over the first portion or frequency range FR1 of the frequency band, and the second logical channel LCH b extending over the second portion or frequency range FR2 of the frequency band assigned to or used by the UE.

Further similarly to FIGS. 4 and 5, the buffer status information in BSR for the first logical channel LCH a has been transmitted in PUSCH of a first time slot of first duration in the first portion FR1 of the band. As illustrated, the BSR for the first logical channel LCH a is transmitted in the second time slot of a second duration in PUSCH of a second portion of the band, preferably, during the transmission of BSR in the first time slot of the first duration in the first portion of the band. This means that the BSR for the first logical LCH a is transmitted in both a first time slot and a second time slot, which may result in a considerable diversity gain of the BSR. In case the BSR in the first time slot is interfered due to sudden interference, there is still high probability for the network side to correctly detect the BSR in the PUSCH in a different time slot configuration. The PUSCH transmission can also exploit a Hybrid Automatic Repeat Request (HARQ) retransmission mechanism, resulting in a better decoding performance.

For another example, a timer will be started after a preset time period after the transmission of BSR for LCH a in a second time slot. It should be also noted that in the examples of FIGS. 4-6, only for illustration, the transmission of BSR/SR in a second time slot is overlapped with the transmission of BSR in a first time slot in the first portion of band.

For still another example, there may be more than one logical channel with a high priority or which is related to delay sensitive services. A corresponding list of high priority channels may be configured by the network side for the communication devices in a static (preconfigured) way or in a dynamic way, through Radio Resource Control (RRC) signaling or MAC CE or downlink control information (DCI) on PDCCH for example.

Figure 7:
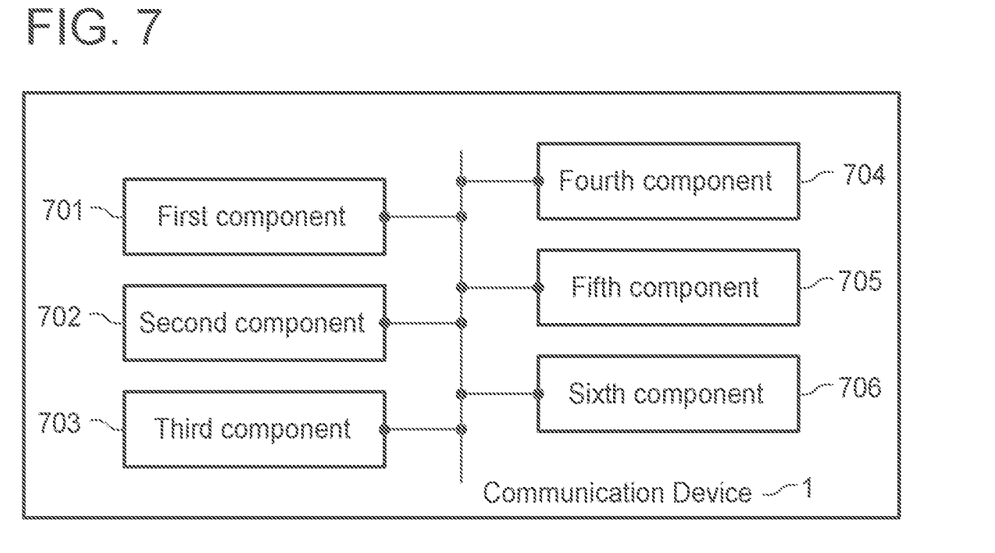
FIG. 7 schematically shows a block diagram of exemplary functional components of a communication device according to one or more embodiments of the invention.

FIG. 7 schematically shows a block diagram of a communication device in accordance to one or more embodiments of the invention. The communication device 1 may be a UE, e.g., UE 1 as shown in FIG. 1 or may be comprised by a UE. In FIG. 7, the communication device 1 comprises a first component 701, a second component 702, a third component 703, a fourth component 704, a fifth component 705 and a sixth component 706. It should be appreciated that the communication device 1 is not limited to the shown elements and can comprise other conventional elements and the additional elements implemented for other purposes.

The first component is configured for performing a first transmitting, in a first time slot of a first duration, comprising transmitting a first BSR, or a first SR, for one or more logical channels, the second component is configured for performing a second transmitting, in a second time slot of a second duration, comprising transmitting a second BSR or a second SR, for at least a first part of the one or more logical channels. The third component is configured for receiving an uplink grant message comprising a slot duration for transmitting the first BSR or the second BSR. The fourth component is configured for performing the following steps: in response to receiving the uplink grant message for transmitting the first BSR: requesting the first component to transmit the first BSR based on its priority for the one or more logical channels, if its required slot duration matches the slot duration comprised in the uplink grant message; in response to receiving the uplink grant message for transmitting the second BSR: requesting the second component to transmit the second BSR based on its priority for the at least the first part of the one or more logical channels, if its required slot duration matches the slot duration comprised in the uplink grant message. The fifth component is configured for setting a timer of a duration during which any further BSR or SR for the one or more logical channels is prohibited after the second transmitting has finished. The sixth component is configured for preconfiguring a list of the one or more logical channels via radio resource control, RRC, signaling.

The components 701-706 are illustrated as separate components in FIG. 7. However, this is merely to indicate that the functionalities are separated. The components can be provided as separate components. However, other arrangements are possible. Any combination of the components can be implemented in any combination of software, hardware, and/or firmware in any suitable location. For example, there could be more systems working together, implemented locally or distributed among several devices coupled together through network, with each system having one or more of the components shown.

The components may constitute machine-executable instructions embodied within a machine, e.g., readable medium, which when executed by a machine will cause the machine to perform the operations described. Besides, any of the components may be implemented as a hardware, such as an application specific integrated circuit (ASIC), Digital Signal Processor (DSP), Field Programmable Gate Array (FPGA) or the like.

Besides, it should be understood that this and other arrangements described herein are set forth only as examples. Other arrangements and components (e.g., user interface, etc.) can be used in addition to or instead of those shown, and some components may be omitted altogether.

Functionalities and cooperation between these components are described in detail in the following.

Firstly, the sixth component 706 preconfigures one or more target logical channels that will be involved in the method of FIG. 3, such as by way of radio resource control (RRC) signaling. Then after the third component 703 receives an uplink grant message comprising a slot duration for transmitting the first BSR or the second BSR, the fourth component 704 performs the following steps: in response to receiving the uplink grant message for transmitting the first BSR: requesting the first component to transmit the first BSR based on its priority for the one or more logical channels, as the first transmitting, if its required slot duration matches the slot duration comprised in the uplink grant message; in response to receiving the uplink grant message for transmitting the second BSR: requesting the second component to transmit the second BSR based on its priority for the at least the first part of the one or more logical channels, as the second transmitting, if its required slot duration matches the slot duration comprised in the uplink grant message.

In one non-limiting example, the first BSR is a long BSR multiplexing respective BSRs of 4 logical channels. In another non-limiting example, the BSR is a short BSR for only just one logical channel.

The first transmitting component is also configured to directly transmit a first SR in a first time slot of a first duration (e.g., of 1 ms) as the first transmitting.

The second transmitting component is also configured to directly transmits a second SR in a second time slot of a second duration (e.g., of 0.25 ms) as the second transmitting.

It may be noted that the durations may be chosen differently, e.g., such that the duration of the first time slot TS1 is 0.25 ms and the duration of the second time slot is 1 ms. It may also be noted that the SRs could be of a single bit, but may indicate one or more related logical channels by its transmitting resources. Alternatively, the SRs could be of multiple bits, and may indicate for itself one or more related logical channels. In yet another example, the second BSR may comprise the whole or a subset of the first BSR, or vice versa, and similarities applies to the SRs.

Furthermore, the second transmitting component can repeatedly transmit the second SR, as the second transmitting, for example, periodically, for example, if no uplink grant is received. Or, the second transmitting component can transmit one or more SRs for another part of the one or more logical channels, as the second transmitting, after the second BSR or the second SR is transmitted. These second transmittings are still in a time slot of the second duration.

It is noted that the time slots of the first duration and the time slots of the second duration are transmitted on different bands, as described with reference to FIGS. 1 and/or 2. It is also noted that the communication device operates in a radio network, such as a new radio network or an Long Evolution (LTE) Network, in which the communication device operates in time slots of the first duration in a first portion of a band and also operates in time slots of the second duration in a second portion of the band and the first portion and the second portion are different.

It is noted that the UL grant messages for the first BSR and the second BSR may be received at the same or different, for example sequential, time.

After the second transmitting is done, the fifth component sets a timer such as logicalChannelSR-ProhibitTimer, that prohibits BSR/SR transmission during the timer running.

As a whole, the communication device as discussed above provides four possibilities: firstly, transmitting a BSR, secondly transmitting an SR, or firstly transmitting an SR, secondly transmitting a BSR, or firstly transmitting a BSR, secondly transmitting a BSR, or firstly transmitting an SR, secondly transmitting an SR. In this way, as a whole, this method can prohibit the BSR/SR transmission for some high priority and delay sensitive logical channels due to the previous BSR/SR transmission when a new preconfigured condition is fulfilled. In other words, the condition for starting/restarting a timer such as logicalChannelSR-ProhibitTimer, that prohibits the BSR/SR transmission during the timer running, is changed, so that the communication device, such as the UE is allowed to transmit BSR/SR for more than 1 times for the same or subset of logical channels, before a prohibit timer is launched. By scenarios, the SR/BSR transmission diversity gain for URLLC is enhanced, and the coverage of BSR/BSR transmission for URLLC is enhanced.

Figure 8:
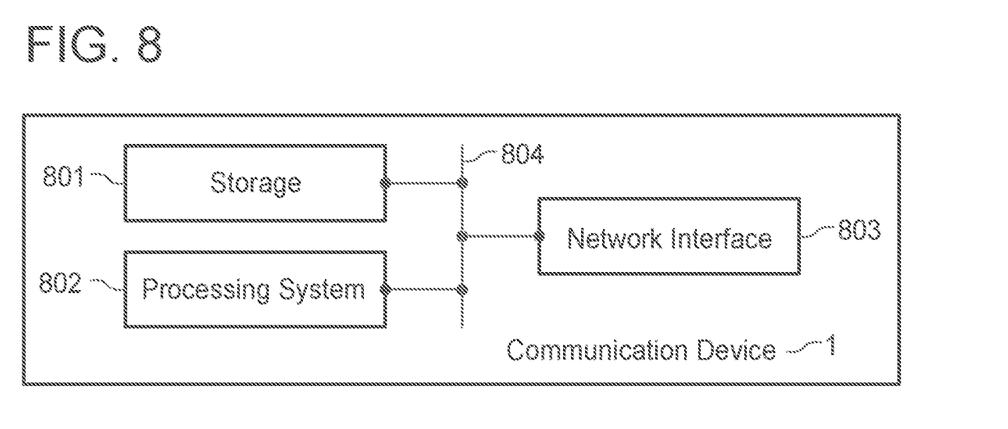
FIG. 8 schematically shows a block diagram of exemplary physical components of the communication device according to embodiments of the invention.

FIG. 8 schematically shows a block diagram of example physical components of the communication device 1 according to embodiments of the invention. As noted in FIG. 8, the communication device generally could be a user equipment, e.g., UE1 of FIG. 1.

In the example of FIG. 8, the communication device 1 comprises a storage 801, a processing system 802, a network interface 803, and a communication medium 804.

The storage 801 includes one or more than one computer-usable or computer-readable storage medium capable of storing data and/or computer-executable instructions. It should be appreciated that the storage medium is preferably a non-transitory storage medium. The storage 801 stores various types of data and/or software instructions. For instance, in the example of FIG. 8, the instructions in the storage 801 can include those that when executed in the processing system, cause the network device 1 to implement the methods described herein with reference to FIG. 3. In some embodiments, several separate storage mediums are used for storing code for implementing the methods described herein with reference to FIG. 3 and related data respectively. Examples of such a storage 801 include hard disk drives, compact disk drives, Blu-ray disk drives, RAID systems, and digital versatile disk (DVD) drives, etc.

The processing system 802 includes one or more than one processing unit. A processing unit is a physical device or article of manufacture comprising one or more integrated circuits that read data and instructions from computer readable media, such as the storage 801, and selectively execute the instructions. In various embodiments, the processing system 802 is implemented in various ways, it can be implemented by one or more integrated circuits, logic circuits, microprocessors or controllers from any desired family or manufacturer. For example, the processing system 802 can be implemented as one or more than one processing core. In another example, the processing system 802 can comprise one or more than one separate microprocessor. In yet another example embodiment, the processing system 802 can comprise an application-specific integrated circuit (ASIC) that provides specific functionality. In yet another example, the processing system 802 provides specific functionality by using an ASIC and by executing computer-executable instructions.

The network interface 803 may be implemented by any type of interface standard, such as an Ethernet interface, a universal serial bus (USB), and/or a PCI express interface. The network interface 803 comprises any one or more of: a transmitter, a receiver, a transceiver, a modem and/or network interface card to facilitate exchange of data with external machines (e.g., STBs of any kind) via a network (e.g., an Ethernet connection, a digital subscriber line (DSL), a telephone line, coaxial cable, a cellular telephone system, etc.).

In the example of FIG. 8, the communications medium 804 facilitates communication among the storage 801, the processing system 802, and the network interface 803. The communications medium 804 can be implemented in various ways. For example, the communications medium 804 can comprise a PCI bus, a PCI Express bus, an accelerated graphics port (AGP) bus, a serial Advanced Technology Attachment (sATA) interconnect, a parallel ATA interconnect, a Fiber Channel interconnect, a USB bus, a Small Computer System Interface (SCSI) interface, or any other type of communication medium or any connection medium that could connect to an external storage.

According to one embodiment of the invention, there is provided one or more computer-readable storage storing computer-executable instructions thereon, that when executed by a computing device, cause the computing device to implement the method with reference to FIG. 3.

According to another embodiment of the invention, there is provided a device adapted to perform the method with reference to FIG. 3.

According to another embodiment of the invention, there is provided a computer program, comprising instructions which, when executed on at least one processor, cause the at least one processor to carry out the method with reference to FIG. 3.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention.

In the following, some further embodiments will be exemplarily described:

E1. A method for a communication device in a radio network, comprising:
    performing a first transmitting, in a first time slot of a first duration, comprising transmitting a first Buffer Status Report, BSR, or a first Scheduling Request, SR, for one or more logical channels;
    performing a second transmitting, in a second time slot of a second duration, comprising transmitting a second BSR or a second SR, for at least a first part of the one or more logical channels.

E2. The method of embodiment 1, further comprising:
    receiving an uplink grant message comprising a slot duration for transmitting the first BSR or the second BSR;
    in response to receiving the uplink grant message for transmitting the first BSR:
    requesting to transmit the first BSR based on its priority for the one or more logical channels, if its required slot duration matches the slot duration comprised in the uplink grant message;
    in response to receiving the uplink grant message for transmitting the second BSR:
    requesting to transmit the second BSR based on its priority for the at least the first part of the one or more logical channels, if its required slot duration matches the slot duration comprised in the uplink grant message.

E3. The method of embodiment 1, wherein the second duration is shorter than the first duration.

E4. The method of embodiment 1, wherein the at least the first part of the one or more logical channels has a higher priority than the other of the one or more logical channels.

E5. The method of embodiment 1, wherein the second transmitting further comprises:
    transmitting, in one or more additional time slots of the second duration, one or more SRs for at least a second part of the one or more logical channels.

E6. The method of embodiment 1 or 5, further comprising:
    setting a timer of a duration during which any further BSR or SR for the one or more logical channels is prohibited after the second transmitting has finished.

E7. The method of embodiment 1, wherein the radio network is a new radio network, in which the communication device operates in time slots of the first duration in a first portion of a band and also operates in time slots of the second duration in a second portion of the band.

E8. The method of embodiment 1, wherein the radio network is a Long Term Evolution, LTE, network, in which the communication device operates in time slots of the first duration in a first portion of a band and also operates in time slots of the second duration in a second portion of the band and the first portion and the second portion are different.

E9. The method of embodiment 1, further comprising:
    preconfiguring a list of the one or more logical channels via radio resource control, RRC, signaling.

E10. A communication device in a radio network, comprising:
    a first component for performing a first transmitting, in a first time slot of a first duration, comprising transmitting a first Buffer Status Report, BSR, or a first Scheduling Request, SR, for one or more logical channels;
    a second component for performing a second transmitting, in a second time slot of a second duration, comprising transmitting a second BSR or a second SR, for at least a first part of the one or more logical channels.

E11. The device of embodiment 10, further comprising:
    a third component for receiving an uplink grant message comprising a slot duration for transmitting the first BSR or the second BSR;
    a fourth component for performing the following steps: in response to receiving the uplink grant message for transmitting the first BSR:
    requesting the first component to transmit the first BSR based on the priorities for the one or more logical channels, if its required slot duration matches the slot duration comprised in the uplink grant message; in response to receiving the uplink grant message for transmitting the second BSR:
    requesting the second component to transmit the second BSR based on the priorities for the at least the first part of the one or more logical channels, if its required slot duration matches the slot duration comprised in the uplink grant message.

E12. The device of embodiment 10, wherein the second duration is shorter than the first duration.

E13. The device of embodiment 10, wherein the at least the first part of the one or more logical channels has a higher priority than the other of the one or more logical channels.

E14. The device of embodiment 10, wherein the second transmitting further comprises:
    transmitting, in one or more additional time slots of the second duration, one or more SRs for at least a second part of the one or more logical channels.

E15. The device of embodiment 10 or 14, further comprising:
    a fifth component for setting a timer of a duration during which any further BSR or SR for the one or more logical channels is prohibited after the second transmitting has finished.

E16. The device of embodiment 10, wherein the radio network is a new radio network, in which the communication device operates in time slots of the first duration in a first portion of a band and also operates in time slots of the second duration in a second portion of the band.

E17. The device of embodiment 10, wherein the radio network is a Long Term Evolution, LTE, network, in which the communication device operates in time slots of the first duration in a first portion of a band and also operates in time slots of the second duration in a second portion of the band and the first portion and the second portion are different.

E18. The device of embodiment 10, further comprising:
a sixth component for preconfiguring a list of the one or more logical channels via radio resource control, RRC, signaling.

E19. A communication device in a radio network, comprising:
a storage, adapted to store data and instructions therein;
a processing system, adapted to perform the steps of any of Embodiments 1-9;
a network interface, adapted to communicate data with other entities in the radio network; and
a communication medium, adapted to facilitate communication among at least the storage, the processing system, and the network interface.

E20. One or more computer-readable storage storing computer-executable instructions thereon, that when executed by a computing device, cause the computing device to implement the method of any of embodiments 1-9.

E21. A device adapted to perform the method of any of embodiments 1-9.

E22. Computer program, comprising instructions which, when executed on at least one processor, cause the at least one processor to carry out the method according to any one of embodiments 1-9.

E23. A carrier containing the computer program of embodiment 222, wherein the carrier is one of an electronic signal, optical signal, radio signal, or computer readable storage medium.

The invention claimed is:

1. A method implemented by a communication device in a radio network, comprising:
transmitting, in a first time slot of an uplink grant associated with a first time slot configuration with a first time slot duration, a Buffer Status Report (BSR) for a plurality of logical channels including a first logical channel associated with the first time slot configuration and a second logical channel associated with a second time slot configuration with a second time slot duration, wherein the second time slot duration is shorter than the first time slot duration;
determining that a traffic flow related to the second logical channel of the plurality of logical channels requires uplink resources configured according to the second time slot configuration; and
transmitting, in a second time slot, a Scheduling Request (SR) for the second logical channel.

2. The method of claim 1, wherein:
the BSR is transmitted in a first portion of a frequency band; and
the SR is transmitted in a second portion of the frequency band.

3. The method of claim 1, wherein the second logical channel has a higher priority than at least one other logical channel of the plurality of logical channels.

4. The method of claim 3, further comprising transmitting a buffer size of a payload for the second logical channel in the BSR together with payload data for the first logical channel in the first time slot.

5. The method of claim 4, further comprising:
starting a timer after transmitting the SR in the second time slot; and
refraining from sending a BSR or SR for the second logical channel while the timer is running.

6. The method of claim 4, further comprising:
starting a timer after transmitting the SR in the second time slot a predetermined number of times; and
refraining from sending a BSR or SR for the second logical channel while the timer is running.

7. The method of claim 1, further comprising:
in response to receiving the uplink grant;
sending a payload of the second logical channel in a second portion of the frequency band in one or more time slots having the second time slot duration.

8. The method of claim 7, wherein the uplink grant is indicative of a PUSCH transmission resource.

9. The method of claim 1, further comprising transmitting, in one or more additional time slots of the second time slot duration, one or more SRs for one or more logical channels in the plurality of logical channels.

10. The method of claim 9, further comprising setting a timer of a duration during which further sending of a BSR or a SR for the one or more logical channels is prohibited after the second transmitting has finished.

11. The method of claim 1, wherein the communication device operates in time slots of the first time slot duration in a first portion of a band and also operates in time slots of the second time slot duration in a second portion of the band.

12. The method of claim 1, further comprising preconfiguring a list of the one or more logical channels in the plurality of logical channels via radio resource control (RRC) signaling.

13. A communication device in a radio network, the communication device comprising:
a network interface for communicating with a radio network node in the radio network;
processing circuitry configured to:
transmit, in a first time slot of an uplink grant associated with a first time slot configuration with a first time slot duration, a Buffer Status Report (BSR) for a plurality of logical channels including a first logical channel associated with the first time slot configuration and a second logical channel associated with a second time slot configuration with a second time slot duration, wherein the second time slot duration is shorter than the first time slot duration;
determine that a traffic flow related to the second logical channel of the plurality of logical channels requires uplink resources configured according to the second time slot configuration; and
transmit in a second time slot of the second time slot duration, a Scheduling Request (SR) for the second logical channel.

14. The device of claim 13, wherein:
the BSR is transmitted in a first portion of a frequency band; and
the SR is transmitted in a second portion of the frequency band.

15. The device of claim 14, wherein the second logical channel has a higher priority than at least one other logical channel of the plurality of logical channels.

16. The device of claim 15, wherein the processing circuitry is further configured to transmit a buffer size of a payload for the second logical channel in the BSR together with payload data for the second logical channel in the first time slot.

17. The device of claim 16, wherein the processing circuitry is further configured to:

start a timer after transmitting the SR in the second time slot; and refrain from sending a BSR or SR for the second logical channel while the timer is running.

18. The device of claim 16, wherein the processing circuitry is further configured to:

start a timer after transmitting the SR in the second time slot a predetermined number of times; and refrain from sending a BSR or SR for the second logical channel while the timer is running.

19. The device of claim 13, wherein the processing circuitry is further configured to:

receive the uplink grant; and send a payload of the second logical channel in a second portion of the frequency band in one or more time slots having the second time slot duration.

20. The device of claim 19, wherein the uplink grant is indicative of a PUSCH transmission resource.

21. The device of claim 13, further comprising transmitting, in one or more additional time slots of the second time slot duration, one or more SRs for one or more logical channels in the plurality of logical channels.

22. The device of claim 21, further comprising setting a timer of a duration during which further sending of a BSR or a SR for the one or more logical channels is prohibited after the second transmitting has finished.

23. The device of claim 13, wherein the communication device operates in time slots of the first time slot duration in a first portion of a band and also operates in time slots of the second time slot duration in a second portion of the band.

24. The device of claim 23, further comprising preconfiguring a list of the one or more logical channels in the plurality of logical channels via radio resource control (RRC) signaling.

25. A non-transitory computer readable recording medium storing a computer program product for operating a communication device in a radio network, the computer program product comprising software instructions which, when run on processing circuitry of the communication device, causes the communication device to:

transmit, in a first time slot of an uplink grant associated with a first time slot configuration with a first time slot duration, a Buffer Status Report (BSR) for a plurality of logical channels including a first logical channel associated with the first time slot configuration and a second logical channel associated with a second time slot configuration with a second time slot duration, wherein the second time slot duration is shorter than the first time slot duration; and determining that a traffic flow related to the second logical channel of the plurality of logical channels requires uplink resources configured according to the second time slot configuration; and transmit in a second time slot of a second time slot duration different than the first time slot duration, a Scheduling Request (SR) for a second logical channel in the plurality of logical channels.

* * * * *

UNITED STATES PATENT AND TRADEMARK OFFICE
CERTIFICATE OF CORRECTION

PATENT NO. : 11,743,760 B2
APPLICATION NO. : 17/204450
DATED : August 29, 2023
INVENTOR(S) : Wang et al.

It is certified that error appears in the above-identified patent and that said Letters Patent is hereby corrected as shown below:

On the Title Page

On Page 2, item (56), under "OTHER PUBLICATIONS", in Column 2, Line 28, delete "3rd Generation Partnership;" and insert -- 3rd Generation Partnership Project; --, therefor.

In the Specification

In Column 1, Line 6, delete "2019," and insert -- 2019, now Pat. No. 10,986,531, --, therefor.

In Column 1, Lines 6-7, delete "PCT/EP/2018/061630," and insert -- PCT/EP2018/061630, --, therefor.

In Column 1, Line 12, delete "RELATED APPLICATIONS".

In Column 1, Lines 14-17, delete "(1) This application is a continuation of U.S. patent application Ser. No. 16/500,461, filed on Oct. 3, 2019, which is a national stage application of PCT/EP2018/061630, filed on May 4, 2018.".

In Column 8, Line 23, delete "an Long Evolution (LTE)" and insert -- a Long Term Evolution (LTE) --, therefor.

In Column 9, Line 52, delete "3GPP 36321," and insert -- 3GPP 36.321, --, therefor.

In Column 13, Lines 35-36, delete "an Long Evolution (LTE)" and insert -- a Long Term Evolution (LTE) --, therefor.

In Column 17, Line 32, delete "embodiment 222," and insert -- embodiment 22, --, therefor.

Signed and Sealed this
Fifth Day of March, 2024

Katherine Kelly Vidal
*Director of the United States Patent and Trademark Office*